Aug. 16, 1955  L. M. SWEIGERT  2,715,291

FISHING LINE DRESSER

Filed Feb. 26, 1953

INVENTOR.
LEON M. SWEIGERT
BY
William J. Ruano
ATTORNEY

United States Patent Office 2,715,291
Patented Aug. 16, 1955

2,715,291
FISHING LINE DRESSER

Leon M. Sweigert, Reading, Pa., assignor to
Grace R. Rightmeyer, Sinking Spring, Pa.

Application February 26, 1953, Serial No. 338,944

2 Claims. (Cl. 43—25)

My invention relates to a device for drying and dressing a fishing line to overcome water-logging and sinking of the line after fishing for a period of time.

After fishing for a few hours, fishing lines usually become water-logged and sink to the bottom, which makes fishing with a fly line almost impossible. If a bait casting line is used, it also becomes water-logged making casting very difficult.

An object of my invention is to provide a device which may be readily snapped onto the end portion of a fishing rod, and which will effect drying of the line as well as dressing as the line is pulled through it, thereby overcoming the above named disadvantages of a water-logged line.

A more specific object of my invention is to provide a fishing line dresser which is of relative simple construction, which is inexpensive to manufacture, and which may be very easily and quickly attached to and detached from the tip portion of a fishing rod, as desired.

A still more specific object of my invention is to provide a hinged unit, preferably of plastic material, including two pairs of felt-like pads, one pair for drying a fishing line and the other for putting the desired dressing on the line so as to convert a water-logged line to one that is dry and dressed and which can be used for several additional hours of fishing.

Other objects and advantages of my invention will become apparent from a study of the following description taken with the accompanying drawing, wherein.

Figure 1:
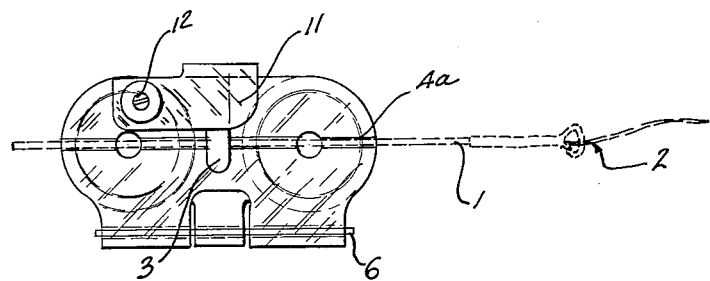
Figure 1 is a plan view of a fishing line dresser unit embodying the principles of my invention and shown mounted on the tip portion of a fishing rod shown in dotted lines.
Figure 2:
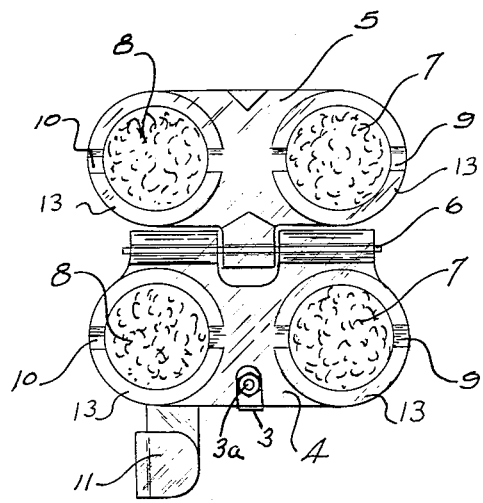
Figure 2 is a plan view showing the unit swung to an open position about its hinge 6.
Figure 3:
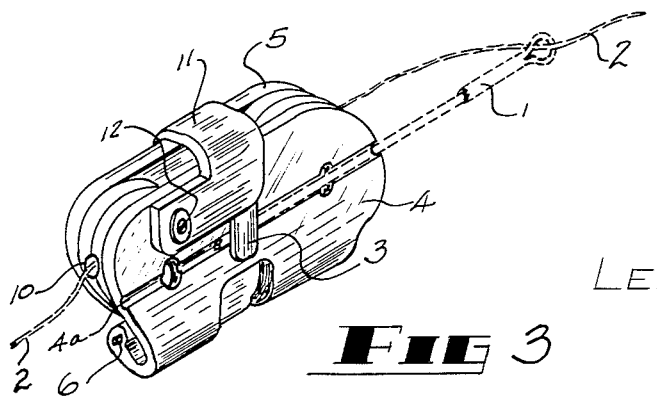
Figure 3 is a perspective view of the fishing line dresser unit shown in Figures 1 and 2, and wherein a tip portion of the fishing rod, and the line are shown in dotted lines.

Referring more particularly to Figures 1, 2 and 3, numeral 1 denotes a tip portion of a fishing rod having the usual eye at the extreme end, through which passes a fishing line 2, the rod and line being shown in dotted outline since they do not form part of the invention.

The fishing line dresser embodying the principles of my invention embodies a casing which is preferably formed of plastic material, although it might be of metal instead, such as aluminum or other non-rusting metal. The casing has fastened on one side thereof a clip 3, preferably of brass, having an end portion rigidly secured to the casing by a rivet or other fastening means 3a. The spring clip 3 is held tightly against the outside of the lower half 4 of the casing. The upper half 5 is hingedly mounted to the lower half 4 by means of a hinge pin 6, preferably of brass. Running longitudinally along the outside of the unit is a V-shaped groove 4a in which the rod tip portion may be seated by slipping it under a spring clip 3 which will resiliently hold the rod within the groove.

As will appear more clearly in Figure 2, each of the hinged halves 4 and 5 has a pair of upstanding annular protuberances 13 forming well portions into which are placed correspondingly shaped pads 7 and 8, preferably of felt, sponge rubber or similar water absorbing material. The front pair of pads 7 are for squeezing water out of the line, whereas the rear pair of pads 8 are saturated with a dressing material of any well known type for dressing the line. Grooves 9 and 10 extend through the upstanding annular protuberances of the well to provide openings through which the fishing line 2 may be passed.

A lock 11, somewhat of U-shaped cross-section, is pivotally mounted on the casing by means of a rivet 12 whereby the lock may be swung about its pivot to unclamping position to enable opening of the casing as shown in Figure 2. When the lock is swung to the closed position, as shown in Figures 1 and 3, its U-shaped portion will tightly embrace and hold together the two halves 4 and 5 of the casing and will also place some pressure on an intermediate portion of spring clip 3 for more tightly holding the clip against the rod tip portion.

In operation, before going on a fishing trip it is desirable to mount the unit or casing on the end portion of the rod by opening the casing and drawing the line therethrough merely for the purpose of applying dressing to the line by pads 8. The unit is then detached and removed by pivotally swinging lock 11 upwardly and opening the halves 4 and 5 about hinge 6 as a pivot.

After fishing a few hours the line will become water-logged and sink. When this happens, or preferably before, the unit is mounted on the rod tip as more clearly shown in Figures 1 and 3, that is by passing the line 2 through the longitudinally aligned grooves 9 and 10 formed in the annular protuberances outlining the wells. Thus, as the line is pulled in, it is tightly squeezed between the front pair of pads 7 so as to draw the water out of the line. As the line passes through the front of pads 8 which are saturated with dressing material, it becomes coated with such a material to minimize the tendency of waterlogging again. Of course, the unit may be applied as frequently as desired depending on how dry the fisherman wishes to keep his line.

After fishing has been completed the unit should be mounted again on the rod and the line passed therethrough so as to squeeze out the water from the line and so as to dress the line as it is being reeled in so that it will be in good condition for the next fishing trip.

The described fishing line dresser unit will fit on any fly or casting rod, and can be made to fit on deep sea rods merely by putting an outward bulge on spring clip 3 to accommodate the larger diameter rod. The unit will take care of any sized line, since grooves 9 and 10 are made sufficiently large to accommodate larger sized lines.

Thus it will be seen that I have provided an efficient, relatively small, lightweight and inexpensive line dresser unit which can be carried in a fisherman's pocket and that can be very quickly attached to or detached from a fishing rod tip; furthermore, I have provided a unit which simultaneously dries a water-logged line and applies dressing material thereto by merely reeling the line through the unit, whereby a fishing line may be conditioned either before, during or after a fishing trip; furthermore, I have provided a unit which can be applied to a wide variety and sizes of fishing rods and fishing lines so that the same unit can be used to take care of lines on practically all makes of fly or casting rods.

While I have illustrated and described a certain, specific embodiment of my invention, it will be understood that this is by way of illustration only, and that various changes and modifications may be made within the contemplation of my invention and within the scope of the following claims.

I claim:

1. A fishing line dresser comprising a casing having two halves hinged together, each half having an inner face in which is formed a pair of wells, each well having a pad, one of the pads of each half containing dressing material for the fishing line and the other pad being water absorbent, and a clip mounted on the outside of one of said halves, whereby the casing may be attached to the tip portion of a fishing rod, said wells defined by annular walls so disposed that when the halves are brought together the walls of the two pairs of wells will make registering contact, there being grooves extending diametrically through said annular walls for accommodating a fishing line, whereby as the line is reeled and drawn through one pair of pads, water will be squeezed out thereof, and as it passes through the second pair of pads containing dressing material, it will be coated with such material.

2. A fishing line dresser, comprising a casing in the form of two halves hinged together, said casing having a groove extending longitudinally along the outside thereof for seating the tip portion of a fishing rod, said casing having a spring clip fastened outside thereof for resiliently holding the fishing rod within said groove, and preventing relative sliding movement, a lock pivotally mounted on one of said halves and comprising a locking piece having a clamp portion of substantially U-shaped cross-section for tightly grasping said spring clip and clamping together said halves in the closed position, each of said halves having an upstanding annular portion defining a well, and a pad contained in each well, one pad in each half containing line dressing material and the other pad being water absorbent, said annular portions of each half being disposed so as to come into registering contact with those of the other half, and so that the pads of one half will be pressed against those of the other half, all of said annular portions having longitudinally extending grooves, whereby a fishing line may be extended through such grooves and be passed through the two pairs of confronting pads, one confronting pair for squeezing out water from the line and the other, for applying dressing material to the line.

References Cited in the file of this patent

UNITED STATES PATENTS

| | | |
|---|---|---|
| 1,652,875 | Rein et al. | Dec. 13, 1927 |
| 1,748,900 | Pilla | Feb. 25, 1930 |
| 2,183,445 | Conterman | Dec. 12, 1939 |
| 2,301,243 | Binkley | Nov. 10, 1942 |

FOREIGN PATENTS

| | | |
|---|---|---|
| 10,745 | Great Britain | May 23, 1899 |
| 984,282 | France | Feb. 21, 1951 |